United States Patent [19]

Miller et al.

[11] Patent Number: 4,618,931
[45] Date of Patent: Oct. 21, 1986

[54] GAS GENERATOR FUEL FLOW THROTTLE CONTROL SYSTEM

[75] Inventors: William H. Miller, McGregor; Samuel E. McClendon, Waco, both of Tex.; Raymond J. Kolodziej, Canoga Park, Calif.; Donald L. Brand, Bend, Oreg.

[73] Assignee: The United States of America as represented by the Secretary of the Air Force, Washington, D.C.

[21] Appl. No.: 591,715

[22] Filed: Mar. 21, 1984

[51] Int. Cl.⁴ ............................................. G06F 15/46
[52] U.S. Cl. ........................... 364/431.02; 364/431.01; 60/243
[58] Field of Search .................. 364/431.02, 431.04, 364/431.01; 60/233, 241, 243, 251

[56] References Cited

U.S. PATENT DOCUMENTS

| | | |
|---|---|---|
| 3,981,442 | 9/1976 | Smith . |
| 4,159,625 | 7/1979 | Kerr . |
| 4,170,040 | 10/1979 | Leblanc et al. . |
| 4,201,161 | 5/1980 | Sasayama et al. . |
| 4,212,065 | 7/1980 | Marchak et al. . |
| 4,220,993 | 9/1980 | Schloeman ..................... 364/431.02 |
| 4,248,042 | 2/1981 | Larsen et al. .................. 364/431.02 |
| 4,277,940 | 7/1981 | Harner et al. ......................... 60/243 |
| 4,380,894 | 4/1983 | Abo et al. ........................ 364/431.02 |
| 4,410,948 | 10/1983 | Doniger et al. ................. 364/431.02 |

Primary Examiner—Parshotam S. Lall
Attorney, Agent, or Firm—Donald J. Singer; Stanton E. Collier

[57] ABSTRACT

A gas generator fuel flow throttle control system provides a fuel rich gas to a propellant grain of a small diameter rocket. An adaptive iterative gain technique allows the throttle to closely follow a commanded fuel flow rate as required by a missile processor.

1 Claim, 6 Drawing Figures

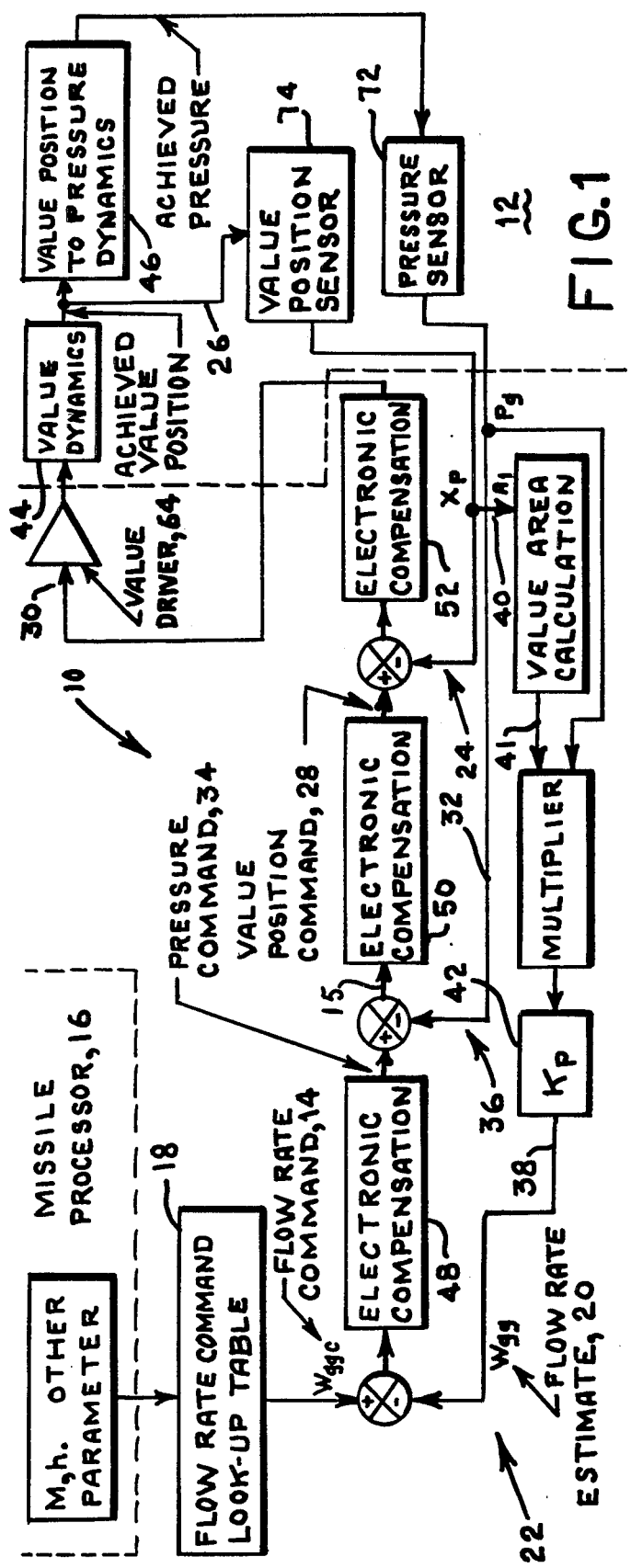
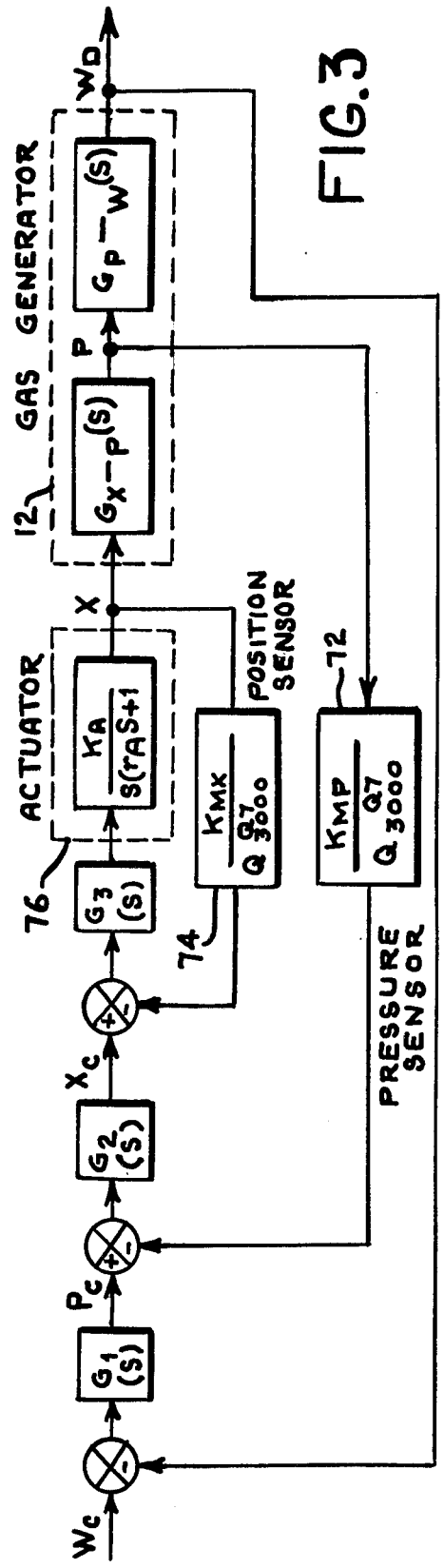

GAS GENERATOR FUEL FLOW THROTTLE CONTROL SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to air-to-air missiles, and, more particularly, relates to the propulsion motors therein.

Today's modern missiles must be versatile in that they should be able to meet current mission requirements to intercept the proposed targets. This is especially true in the case of air-to-air missiles where the performance characteristics of both the releasing and target aircraft can change not only because of technology changes but because different aircraft are used in combat at different times.

In order to meet this requirement a throttable motor is desired. Because of the complexity involved, these systems in the past have been usually limited to large diameter missiles.

The present invention is directed toward providing a throttle control system where these undesirable characteristics are eliminated.

SUMMARY OF THE INVENTION

The present invention sets forth a microprocessor controlled gas generator fuel flow throttle control system (TCS) which overcomes the problems set forth hereinabove.

A gas generator when ignited supplies a fuel rich gas to a solid propellant grain. By changing the flow rate of the gas, different thrust levels can be achieved.

The desired level of control for the variable fuel flow rate is achieved by controlling the generator valve orifice area and chamber pressure in response to a fuel flow rate command. The flow rate command is derived from a fuel flow rate look-up table as a function of vehicle flight conditions such as altitude, Mach number, etc.

Flow rate control is obtained by a flow rate control loop with two additional inner loops. The innermost loop is a valve position (area) control loop where the measured valve position (areas) is compared with the commanded valve position with the resulting error signal providing corrective valve positioning. The fuel generator pressure changes as a function of the new valve area. New valve position commands originate from the compensated error signal derived from the measured pressure feedback and pressure command. New pressure commands originate from errors between the command flow rate and a calculated flow rate. The calculated flow rate is computed from the product of the measured valve area, a generator pressure, and a proportionality constant.

Digital command data, specifying the desired discharge fuel rate, are received by the TCS and stored in a data latch. These data are used to address the look-up table EPROM (MCM2716). The look-up table data output supplies the flow rate command to the microprocessor (MC6802) of the TCS.

The pressure and actuator position sensor signals received by the TCS are conditioned by a strain gage amplifier and an operational amplifier, respectively. These signals, as well as two spare signals, are then input to a data acquisition system (ADC0808) to be converted to a digital format for the data bus.

Operation of the microprocessor is controlled by the program memory (MCM2716) which contains the step-by-step instruction programs for the microprocessor. The programmable timer (MC6840) provides the timing for the data acquisition system sampling, basic processing time (including gas generator startup, if required), and the pulse-width modulation (PWM) for the actuator power switching amplifier.

The peripheral address decoder enables select lines for various items such as the fuel flow rate look-up table, data acquisition system, test data latch and actuator power amplifier. The switching power amplifier converts +5 volt DC pulse-width modulation from the programmable timer to +28 volt DC pulses that are used to drive the actuator that controls the valve area.

It is therefore one object of this invention to provide for a throttle control system useable in a gas generator of a ramburner of a small diameter air-to-air missile.

It is another object of this invention to provide for a TCS that is adaptable to various aircraft because of its programmable nature.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIG. 1 is a block diagram of the throttle control system of the present invention;

FIG. 3 is a block diagram of a computer simulation of the present invention;

DETAILED DESCRIPTION OF THE PREFERRED EMBODIMENT

Figure 2:
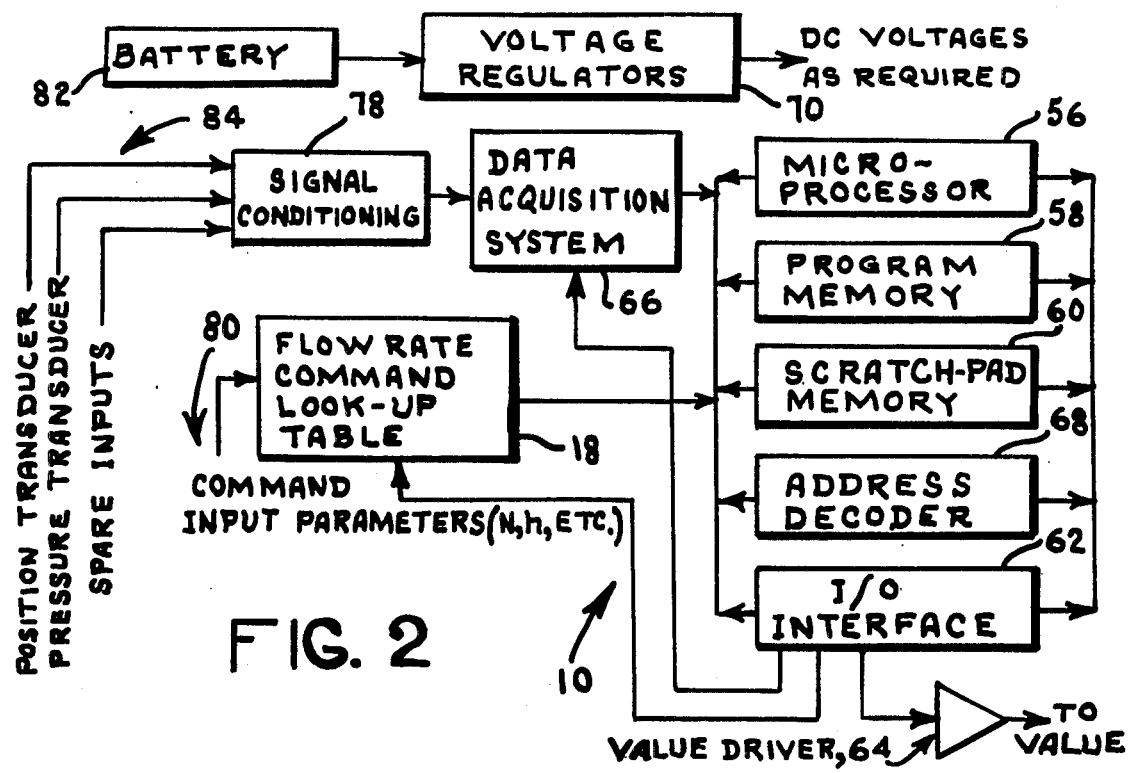
FIG. 2 is a block diagram of the required electronics for the throttle control system of this invention.

Referring to FIG. 1, the basic purpose of a throttle control system 10 (TCS) is to control fuel flow rate from a fuel generator 12 to the missile ramburner, not shown, in response to mission-dependent requirements. For example, fuel flow rate may be controlled to achieve optimum efficiency by matching fuel rate to the available inlet air to ensure full combustion; to achieve an optimum velocity profile, by adjusting fuel rate to achieve desired thrust. Additionally, use of fuel flow rate control allows compensation for fuel generator performance variations due to fuel temperature effects. Therefore, TCS 10 addresses two functions:

(1) Determination of desired instantaneous fuel flow rate (2) Control of fuel flow rate to achieve desired value Determination of a desired fuel flow rate is influenced by tactical and mission requirements as well as by sensor (speed, acceleration, altitude, etc.) inputs. This information is generally available only to a missile main processor 16. For this reason, primary determination of a commanded fuel flow rate 14 has been assumed to be performed in missile processor 16 with only supporting activity in TCS 10. Thus, missile processor 16 inputs speed and altitude information, for example, over a simple serial data link and TCS 10 uses a look-up table 18 to convert that data to a commanded fuel flow rate 14. This approach has as advantages a simple interface and good adaptability, since the table 18 can readily be changed to accept various combinations of control parameters. For these reasons, a digital data interface and look-up table are incorporated into TCS 10 to provide determination of commanded fuel flow rate 14.

Control of fuel generator commanded fuel flow rate 14 requires a means of measurement or estimation of the discharge fuel rate for comparision with the commanded value. Direct measurement using a flowmeter sensor is generally impractical because of the flight environment and the high temperature of the exhaust gases. However, existing ballistic equations can be calibrated and solved to accurately provide an estimated fuel flow rate 20, given the orifice area and chamber pressure. Since chamber pressure can be directly measured with acceptable sensors and effective orifice area can be readily calculated from measured throttle position, the ballistic equation solution was incorporated into TCS 10.

Combining these concepts for determination of commanded and estimated fuel flow rate, 14 and 20, respectively, with conventional servo technology results in a system as shown in FIG. 1. As shown, commanded fuel flow rate 14 is derived from fuel flow rate look-up table 18, which has been consulted as a function of input parameter such as Mach No. (M) and altitude (h) or others as deemed necessary. In a tactical configuration, the input parameters will be derived from main missile processor 16.

The execution of commanded flow rate 14 will be performed by a flow rate control loop 22 containing two additional nested loops. The innermost loop is a valve-position-control loop 24 where a measured valve position 40 is compared with a commanded valve position 28, with a valve error signal 30 used to drive a valve, not shown, to the correct position through a valve driver 64. Fuel generator 12 pressure changes as a result of this new valve area. A measured pressure 32 is fed back to be compared with the commanded pressure 34 and thus close a pressure control loop 36. A new pressure command 15 originates from errors between commanded flow rate 14 and a calculated flow rate 38 as shown in FIG. 1. Calculated flow rate 38 is computed as a function of the measured valve area 41, measured pressure 32, and a proportionality constant 42.

Figure 4:
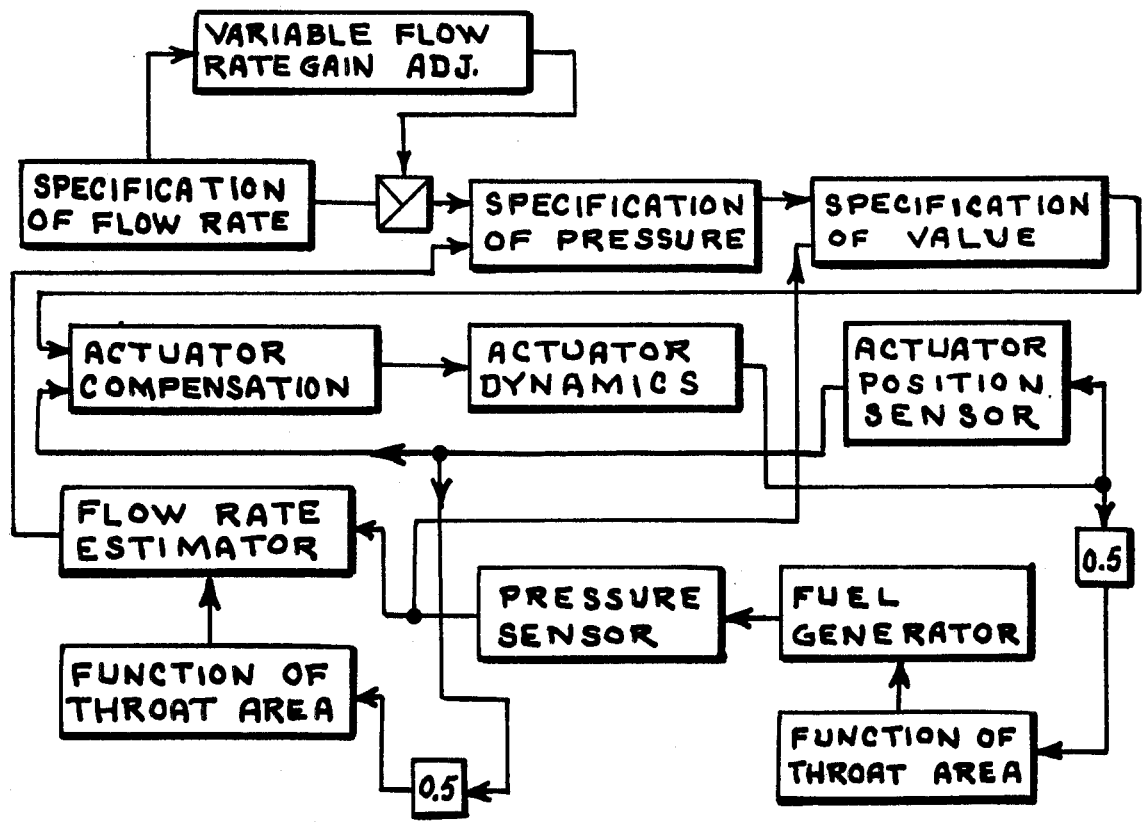
FIG. 4 is a flow diagram for the TCS computer simulation of the present invention.

To guarantee stability and satisfactory performance, valve dynamics 44 and valve position-to-pressure dynamics 46 were modeled and inserted into a computer simulation of TCS 10 shown in FIGS. 3 and 4. Considerable analyses were performed to determine the extent and nature of electronic compensations 48, 50 and 52 necessary.

Mechanization of TCS 10 with either analog or digital circuitry is possible, and both were considered. While an analog approach appears to require slightly fewer components, it has disadvantages of drift with time and temperature, complexity in adjustment to close tolerances, and low flexibility to design modifications. Therefore, a digital programmable controller making maximum use of large-scale integration (LSI) and hybrid technology was selected for the mechanization. The inevitable reduction of cost per equivalent gate (furthered by LSI fabrication techniques) will make a digital controller the least costly solution. Further, a programmable controller will provide the flexibility needed to adapt to changes and improvements. Required is adequate speed, low power, high packing density (LSI or hybrid), micrprogrammable or suitable fixed instruction set, low cost, high reliability, and performance over operational temperature and vibration extremes. In general, power consumption is directly coupled to processing speed. Very high speed is not needed, but low power consumption is a prime consideration for the processor because it allows for reduced battery size and a simplified power regulator design. For these reasons, a metal oxide semiconductor (MOS-type LSI processor will be used. It is considered that this approach will result in a flight-type design consistent with modern distributed processor missile electronics designs.

FIG. 2 depicts an overall electronic mechanization diagram with a microprocessor 56 at the center of TCS 10. TCS 10 contains an erasable, programmable read-only memory (EPROM) for a program memory 58 and a random-access memory (RAM) for a scratch-pad memory 60. All inputs and outputs are directed and controlled by microprocessor 56. The input/output (I/O) interface 62 conditions all data to and from microprocessor 56. Valve driver 64 is a high-current semiconductor switch used to control direction and speed of valve movement. At least two analog signals, valve position and pressure, must be digitized for microprocessor 56 use. This is done by multiplexing these signals in turn into an analog-to-digital converter (ADC). These conversion functions are performed in the hardware by an 8-channel 8-bit data acquisition system 66. Spare input channels are provided to allow for the possibility of sensing additional pressure transducers or other inputs as may be required. The commanded flow rate look-up table 18 is mechanized with a programmable, read-only memory (PROM) addressed by the input parameters (M, h, etc.). It should be noted that in a flight configuration, this input is provided by a serial data link from main missile processor 16. A serial link will drastically reduce the wire count involved in transmitting several multi-bit parameters words.

Some supporting circuitry will be required in the form of control logic to generate microprocessor 56 and data acquisition system 66 timing signals as well as address decoding by address decoder 68 to allow reading of ADC data and look-up table 18 data by microprocessor 56. Additionally, monolithic voltage regulators 70 will be used to regulate a battery 82 voltages to the power forms required by the electronics.

General design requirements for TCS 10 electronics were that it should be a microprocessor-based, digital-control system to provide drift-free operation and allow system reconfiguration by software changes. Interface with the fuel generator sensors, not shown, with analog signal conditioning 78, FIG. 2, and analog-to-digital conversion in data acquisition system 66; and the throttle valve actuator should be driven by a semiconductor switching circuit.

Sensors signals 84 provided by fuel generator 12 assembly are pressure from a pressure sensor 72 and position from a valve position sensor 74 shown in FIG. 1. Pressure sensor 72 provides a full-scale output of 30 millivolts at 25000 psi pressure and 10 volts DC excitation. Position sensor 74 provides 0 to 100 percent output of its excitation voltage over a 1-inch travel.

The throttle valve actuator selected for the fuel generator 12 provides a rated operating load of 250 lb when powered with +28 VDC or −28 VDC at 1.2 ampere maximum. The output shaft provides a 1.2-in. linear stroke and 0.08-in./sec nominal loaded speed.

Component selection criteria were to achieve the required performance while minimizing size, weight, power, complexity, and cost. In addition, producibility and reliability were to be maximized and Military-qualified components were to be used where possible.

Figure 5:
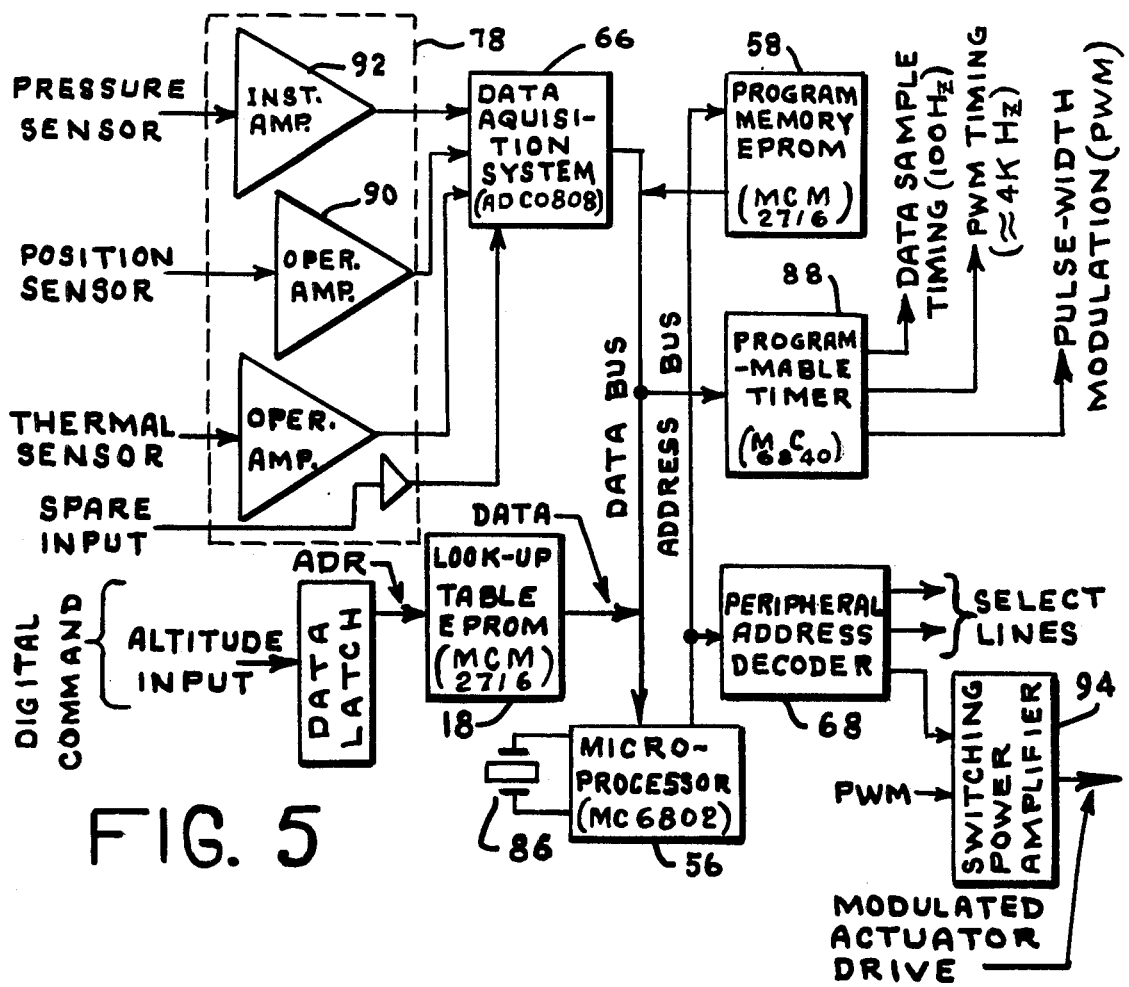
FIG. 5 is a block diagram of the throttle control electronics of the present invention.

Referring to FIGS. 2 and 5 the most significant component selections were the microprocessor 56 Central Processing Unit (CPU) and its associated processing functions. These elements must be selected from a compatible grouping to ensure proper interfacing when operated together. Processing elements required for TCS 10 include a crystal oscillator 86, scratched memory 60 (RAM), alterable program memory 58 (EPROM), timer 88, and address decoder 68. Several microprocessor component "families" were evaluated on the basis of instruction set, speed, power consumption, required power forms, and availability of compatible peripheral devices.

This evaluation led to the selection of the 8-bit MC6800 processor family and, specifically, the MC6802 microprocessor 56. The MC6802 combines the crystal oscillator, CPU, and RAM elements in a single device while providing a nominal instruction set, speed, and power. Only 5 VDC power is required, and MIL-STD-883 devices are available for operation from −55° to 125° C. The MC6800 family has an extensive selection of compatible peripheral devices for this bus-oriented device.

MC6840 programmable timer 88 was selected from the processor family to provide three timer functions under control of the microprocessor. These timers allow precise timing of the system sampling rate and driver switching while relieving the CPU of timekeeping tasks. Peripheral family devices were also considered for the address decoding and interface adapter functions; but they were rejected in favor of standard MSI logic chips since the relatively simple functions required in these areas do not utilize LSI devices efficiently.

The memory device selected for alterable program memory 58, MCM2716, is an ultraviolet erasable, electrically programmable read-only memory (EPROM) with a storage capacity of 2048 bytes of 8-bit data. This device features a sealed window through which intense ultraviolet light may be directed to erase the stored information; updated program instructions may then be stored in the EPROM by electrical signals. The EPROM device was used during the development; it would be replaced with a completely permanent read-only-memory (ROM) device in quantity production.

The MCM2716 EPROM was also used for the commanded flow rate look-up table 18. The EPROM address lines allow accepting up to 11 bits of input parameter data and converting these to up to 2048 values of commanded fuel flow rate with 8-bit resolution.

Selection of components for the signal conditioning 78, also in FIG. 2, and data acquisition 66 was another sensitive area, since system accuracy can be no better than its ability to measure output response. Various analog-to-digital converters (ADC) were considered including 8-, 10-, and 12-bit devices. An 8-bit conversion was selected to achieve a reasonable balance of resolution (0.4 per cent) and complexity, since 8-bit data interface directly with the 8-bit processor data bus. Review of the expected rates of variation of the pressure and position signals indicated that moderate ADC conversion periods (about 100 microsecond) were adequate to eliminate the need to sample and hold the signals during conversion.

These considerations led to selection of the ADC0808 data acquisition component. This device consists of an 8-input analog multiplexer combined with an 8-bit ADC in a monolithic CMOS integrated circuit. The ADC0808 requires only VDC power, has a conversion time of 100 sec, and is easily interfaced to the MC6802 microprocessor. Since this ADC is capable of ratiometric measurement, an accurate voltage reference was not required—only that the same voltage be supplied for ADC reference and sensor excitation. This allowed use of the filtered 5 VDC to power both the ADC and sensors and to serve as reference.

Signal conditioning 78 for the position input signal required only a simple filter and unity gain amplifier since the linear potentiometer output varies from 0 to 5 VDC. The filter reduces the effect of noise from the digital and motor circuits and the amplifier provides a low impedance to the ADC input. An LM108A operational amplifier 90 was selected in view of its low power consumption and ability to operate from moderately regulated supply voltages.

Signal conditioning 78 for the pressure input signal was more complex, requiring a balanced measurement of the sensor bridge. With 5 VDC excitation this sensor outputs only 15 millivolts at a full-scale pressure of 2500 psi. The LH0038 instrument amplifier 92 was selected to amplify the signal by a factor of 400 with an error of 0.3 per cent, maximum. This gain produces full-scale input (5 VDC) to the ADC at 2083 psi, meeting the desired operating range. The LH0038 was also selected based on its low offset (100 V maximum), drift, noise, and power consumption.

An MOS transistor switching power amplifier 94 using discrete components was designed to supply the actuator drive output. Pulse-width modulation techniques were used to proportionally vary the drive voltage under control of the programmable timer 88. Direction of actuator movement is commanded directly from microprocessor 56 to drive amplifier 94.

TCS 10 electronics circuit design and component selection minimized the requirements for regulated DC power forms. All the digital components require only 5 VDC and the analog circuits require a small amount of power at approximately ±8 VDC. Switching power amplifier 94 is operated directly from the raw battery voltages. These factors made it practical to select the battery voltages to be ±15 VDC nominal—requiring only a mid-point tap on thermal battery 82. Simple zener circuits provide ±8 VDC and an LM109K integrated circuit voltage regulator was selected to reduce the +15 volt battery voltage to 5 VDC.

The software for TCS 10 orchestrates the hardware so as to synthesize the desired control functions to be explained hereafter. The software performs the following tasks:

a. Consults flow rate look-up table 18 for commanded flow rate 14.

b. Closes valve position, pressure, and flow rate feedback loops 24, 36 and 22, respectively.

c. Differences command from indicated value-to-generate error signals for all three loops.

d. Provides electronic frequency compensation as required to ensure stability and desired performance.

e. Calculates flow rate 38 from the product of measured valve area 40, pressure 32, and a proportionality factor 42.

f. Controls initialization of the loops so as to perform in the desired manner during fuel generator start-up transient.

f. Controls fuel generator ignition sequence in tactical designs.

h. Provides for signal limiting, thresholding, and scaling as may be required.

i. Provides for additional adaptability to other input parameters (temperature, combustor pressure, angle of attack, etc.) as may be required.

Computer-aided design was used extensively for system analysis and design. Using CSMP computer language, a program was coded to simulate fuel generator 12 static and dynamic responses utilizing ballistic and gas equations with parameter values derived from fuel test measurements. A generalized model of TCS 10 electronic compensation was also included in this simulation program in order to study the effects on system performance of various compensation networks. System analyses and simulations were used in parallel, with each providing feedback to the other, to arrive at an optimum TCS 10 design. A simplified block diagram of the simulation is shown in FIG. 3 indicating the form of transfer functions for an actuator 76, fuel generator 12, valve position sensor 26, and pressure sensor 72. Transfer functions for TCS 10 electronic compensation are shown as factors G1, G2, an G3.

A CSMP III program was written for digital simulation of TCS 10. The program is based on linearized process models and control compensation. The simulation program includes fuel generator parameter values and actuator characteristics. The program contains the simulated variable throttle control system 10 in Laplace-transform notation and defines the nominal pressure command and actuator loop initialization values, loop activation times, pressure loop, and actuator loop limit levels, saturation levels, non-linear elements, variable flow rate command mechanization and programmed $K_1$ and $K_2$ loop gains. FIG. 4 is a computer flow diagram for the system. The simulation program, in the fully developed form, includes sampling (i.e., time quantization) and amplitude quantization in addition the actuator non-linear characteristics of backlash, time delay, rate saturation limit, etc.

The program has various input options controlled by the initial condition parameters. The amplitude and time characteristics of fuel flow were chosen to represent typical flight profiles, and are processed within microprocessor 56 in equation form. The ignition transient is represented by a simplified sequence of pressure buildup utilizing function generation until the pressure control mode starts at $t_o$. Not included is the main chamber burn pressure perturbation simulation due to possible propellant burn irregularities. Variation in compensation, selection of nonlinear characteristics for study, variable gain programming, updating of propellant burn rate properties, etc. can be selected by appropriate choice of initial condition parameters.

Linear and iterative control techniques were used but did not fully meet expectations. An improved version of the iterative-type control technique was developed and included a shorter sample period, variable sample period, and adaptive gain. A primary goal was to make the control system self-adapting to temperature variation of the fuel generator parameters.

Generator response to throttle valve plunger movement can be characterized by plotting the slope of the plunger position ($X_p$) curve as a function of fuel discharge rate ($W_d$) at equilibrium conditions. The characteristic ($dX_p/dW_d$) displays the relative sensitivity of generator discharge rate to plunger motion at each value of discharge rate. For small plunger movements, this curve may also be used as the desired controller gain, by noting that the amount of plunger movement ($\Delta X_d$) to correct a discharge error ($\Delta W_d$) from the commanded value may be approximated by Equation I $$\Delta X_p \approx (dX_p/dW_d)(\Delta W_d) \tag{I}$$

The dX/dW characteristics of the throttable generator were calculated at temperatures of $-65°$, $77°$, and $165°$ F., based on measured fuel parameters.

A more versatbile approach rather than having a maximum and minimum gain is to construct a control system that determines the optimum gain to use as it operates (an adaptive control). This is easily accomplished by using the ability of microprocessor 56 to monitor response history of generator 12 and to make decisions for increasing or decreasing gain to improve tracking.

To maintain a uniform relative change in gain as adjustments are made, 17 $GX_p$ gain curves were fitted over the desired range. The curves are related to the minimum gain curve by Equation II.

$$GX_{pn} = (1.175)^n GX_{po} \tag{II}$$

where $$0 \leq n \leq 16$$

Thus, each succeeding curve provides a gain increase of 17.5 percent from the previous value for integer values of n. The adaptive gain range available from minimum to maximum $GX_p$ curves is $(1.175)^{16} = 13.2$.

A set of rules to control the variation of n were selected. The first rule establishes an accpetable error band of $\pm 0.02$ lb/sec, where no gain change is performed. The second rule tests the tracking error to see if it has changed polarity from the last iteration. This rule detects those instances where the control has converged so rapidly that it overshoots, or crosses, the commanded fuel flow rate 14. If this occurs, the gain is reduced severely (n reduced by 4), since such crossings generally indicate a developing instability. The third rule compares the magnitude of the current error with that of the preceding iteration. If the current error is greater than 50 percent of the last error, gain is increased by increasing n by 1. If the current error is less than 50 percent of the last error, n is decreased by 1. This rule allows the gain to be gradually varied to coverage on the optimum value for tracking.

Figure 6:
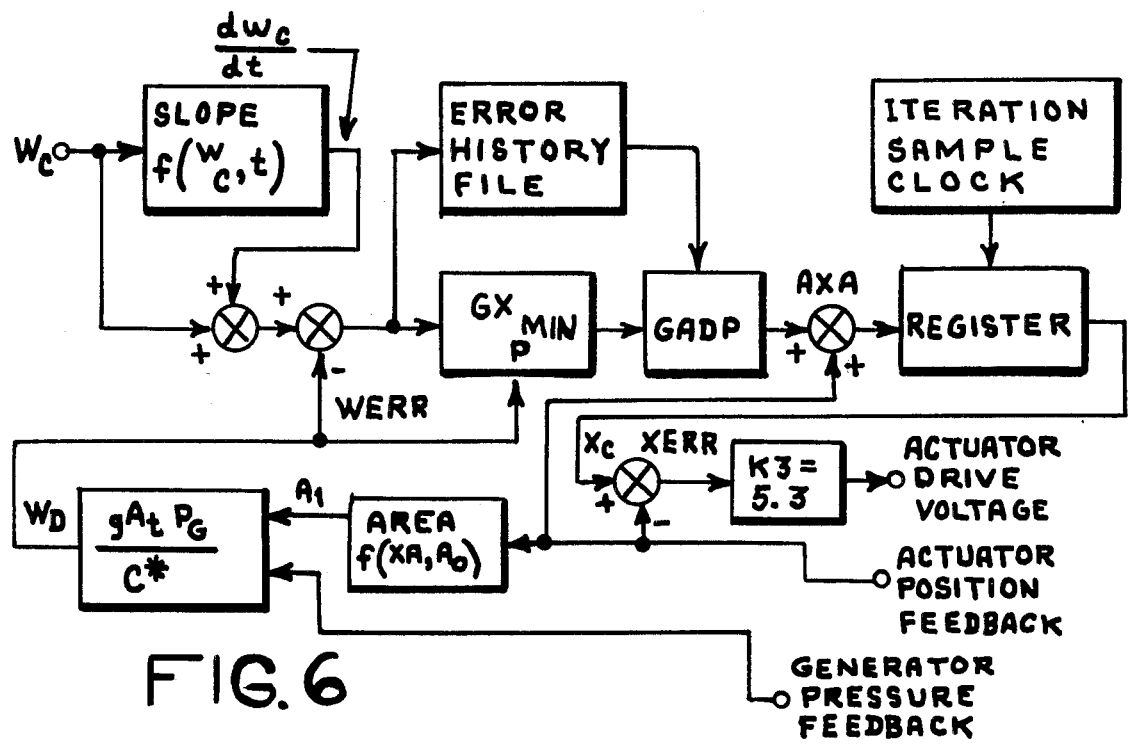
FIG. 6 is the adaptive iterative control clock diagram used in the present invention.

The adaptive iterative TCS block diagram in FIG. 6 shows the addition of the adaptive gain factor (GADP) to the forward control loop. Also shown is the error history file that is used to determine n and, hence, GADP.

TCS 10 was programmed to incorporate the $GX_p$ gain characteristic curve of fuel geneator 12 and the GADP adaptive gain determination routine. Hardware simulation tests gave results similar to those obtained with the digital simulation. Three test firings were then conducted using prototype hardware and cartridge-loaded grain assemblies. The first test consisted of throttling a fuel generator, conditioned to 165° F., to the high-mission fuel flow rate schedule. Ballistically, the generator performed as predicted and demonstrated an expulsion efficiency of 100 per cent. During this test, the valve plunger was held in its initial position for 1 second following ignition; control corrections were the performed at 1-second intervals throughout the test.

Recovery from the ignition transient occurred within 5 sec and tracking of the commanded flow rate 14 was relatively accurate throughout the remainder of the test. A slight divergence developed at about 40 sec; however, this was detected by the TCS 10 program leading to a decrease in gain and subsequent convergence of the perturbation at about 55 sec. During the firing, the discharge rate was within an error band of ±0.02 lb/sec of the commanded value approximately 60 percent of the time, with a maximum error of 0.065 lb/sec occurring at about 49 sec.

Detailed review of the test results indicated that several of the crossings of the command profile were rejected by the adaptive algorithm since they occurred during periods within the acceptable error band. Had the gain been reduced on these events, it is probable that the later instability would not have developed. Accordingly, for subsequent tests, it was decided to change the sequence of the adaptive gain tests such that command-crossing decisions would be the earliest test.

Again, the generator performed ballistically as predicted. Measured expulsion efficiency was 100 per cent.

Again, fuel flow rate 14 tracking was relatively accurate throughout the mission. The initial 20 sec of the mission was almost identical to that of the previous test, indicating a high degree of repeatability. Recovery from the ignition transient was accomplished within 5 sec; and the maximum tracking error during the first 35 sec was 0.05 lb/sec, occurring at about 8 sec.

At about 36 sec, a sudden slight increase in throttle area was observed, with the attendant increase in thrust and decrease in pressure and calculated discharge fuel rate. Probable cause was flaking off of minor deposits in the throttle orifice. The tracking error increased to a maximum of 0.06 lb/sec at 37 sec as the control began correcting, to reduce the error to 0.025 lb/sec at 40 sec. Tracking error gradually increased after 40 sec to 0.075 lb/sec at 44 sec. Near the end of the mission, discharge peaked at 1.27 lb/sec.

Clearly, many modifications and variations of the present invention are possible in light of the above teachings and it is therefore understood, that within the inventive scope of the inventive concept, the invention may be practiced otherwise than specifically claimed.

What is claimed is:

1. A throttle control system for controlling a gas flow from a gas generator to a solid propellant grain of an air-to-air missile, a plurality of input signals from a missile command processor and a plurality of feedback sensor signals from said gas generator controlling at least one output signal from said throttle control system, said throttle control system comprising:

a look-up table means, said look-up table means receiving said input signals from said missile command processor, said input signals addressing said look-up table means whereby said look-up table means outputs preselected data being a commanded fuel flow rate signal based upon said input signals;

means for signal conditioning, said feedback sensor signals being input said signal conditioning means, said signal conditioning means operating on said feedback sensor signals for digital signal processing, said signal conditioning means outputting conditioned feedback sensor signals;

a data acquistion means for multiplexing and converting said plurality of conditioned feedback sensor signals from analog to digital signals, said data acquisition means outputting a plurality digital signals;

a microprocessor, said microprocessor receiving said commanded fuel flow rate signal from said look-up table means and said digital signals from said data acquisition means, said microprocessor operating upon said digital signals in accordance with a program, said microprocessor outputting an actuator signal to control said gas generator;

means for memory, said memory means connected to said microprocessor by a data bus and an address bus, said memory means storing said program, said program minimizing a fuel flow error rate being the difference between a slope adjusted commanded fuel flow rate signal and a calculated fuel flow rate signal based upon said feedback sensor signals and said commanded fuel flow rate signal, said error rate determining an adaptive gain factor, said adaptive gain factor being defined as $$GX_{pn} = (1.175)^n GX_{po}$$

said n being determined from an error history file stored in said memory means, said error history file having data therein to determine the next value of n whereby said n remains constant if said fuel flow error rate falls within an error band of a selected value, said n is reduced by a selected value if said fuel flow error rate changes polarity, said n changes by a selected value if a magnitude of a current fuel flow error rate is different by a preselected percentage than a previous fuel flow error rate;

an address decoder, said address decoder connected to said microprocessor and said memory means, said address decoder allowing said microprocessor and said memory means to read said digital signals from said data acquisition circuit and said commanded fuel flow rate from said look-up table;

a timer, said timer connected to said microprocesor, said timer outputting a pulse width modulated signal;

a voltage regulator, said voltage regulator converting input voltages to selected voltages and applying said selected voltages to said throttle control system;

a switching power amplifier, said amplifier being connected to said voltage regulator and providing a drive voltage, said power amplifier being connected to said microprocessor and said timer through said address decoder, said microprocessor outputting said actuator signal that determines a direction of movement of said actuator, said timer proportionally varying said drive voltage by pulse-width modulation; and a valve driver, said valve driver being used to control direction and speed of a valve in a throttle of said gas generator, said valve driver connected to said switching power amplifier.

* * * * *